(12) United States Patent
Peterson

(10) Patent No.: US 6,892,461 B2
(45) Date of Patent: May 17, 2005

(54) WEED TRIMMER SAFETY GUARD

(75) Inventor: Fred J. Peterson, 1219 Tische Rd., Jefferson, OH (US) 44047

(73) Assignee: Fred J. Peterson, Jefferson, OH (US)

(*) Notice: Subject to any disclaimer, the term of this patent is extended or adjusted under 35 U.S.C. 154(b) by 0 days.

(21) Appl. No.: 10/630,602

(22) Filed: Jul. 30, 2003

(65) Prior Publication Data
US 2004/0020060 A1 Feb. 5, 2004

Related U.S. Application Data

(60) Provisional application No. 60/399,595, filed on Jul. 30, 2002.

(51) Int. Cl.[7] .............................................. B26B 29/00
(52) U.S. Cl. ............................. 30/276; 30/347; 30/286
(58) Field of Search .......................... 30/276, 286, 347; 56/12.7, 295; 8/8

(56) References Cited

U.S. PATENT DOCUMENTS

| | | | | |
|---|---|---|---|---|
| 4,172,322 A | | 10/1979 | Ballas | 30/276 |
| 4,329,834 A | | 5/1982 | Hetrick | 56/295 |
| 4,561,180 A | * | 12/1985 | Pittinger et al. | 30/276 |
| 4,630,371 A | | 12/1986 | Graham | 30/347 |
| 4,651,422 A | * | 3/1987 | Everts | 30/347 |
| 4,823,464 A | | 4/1989 | Gorski | 30/276 |
| 4,893,457 A | | 1/1990 | Castain | 56/295 |
| 5,048,187 A | * | 9/1991 | Ryan | 30/276 |
| D347,773 S | | 6/1994 | Nash | D8/8 |
| 5,351,403 A | * | 10/1994 | Becker et al. | 30/276 |
| RE34,815 E | | 1/1995 | Byrne | 172/15 |
| 5,423,126 A | | 6/1995 | Byrne | 30/276 |
| 5,491,962 A | | 2/1996 | Sutliff et al. | 56/12.7 |
| 5,584,348 A | | 12/1996 | Butler | 172/13 |
| 5,878,556 A | * | 3/1999 | Franz | 56/12.7 |
| 6,052,976 A | * | 4/2000 | Cellini et al. | 56/17.4 |
| 6,226,876 B1 | * | 5/2001 | Ezell | 30/276 |
| 6,324,765 B1 | | 12/2001 | Watkins, Sr. | 30/276 |
| 2002/0083596 A1 | | 7/2002 | Richardson | 30/276 |
| 2004/0148783 A1 | * | 8/2004 | Cashman et al. | 30/276 |

FOREIGN PATENT DOCUMENTS

JP     01095342     4/2001

* cited by examiner

Primary Examiner—Hwei-Siu Payer
(74) Attorney, Agent, or Firm—Patrick J. Daugherty; Driggs, Lucas, Brubaker & Hogg Co., L.P.A.

(57) ABSTRACT

The present invention provides for an article and method for an improved weed trimmer cover that prevents unwanted projectile and debris distributions. A preferred embodiment of the weed trimmer comprises a domed guard structure that encompasses the effective cutting range of a prior art weed trimmer. Alternative embodiments may comprise elements that protect only portions of front, side and rear cutting areas. Embodiments of the invention also allow a user to lift up a cover element to allow close work among obstructions. Embodiments of the present invention also improve the performance of prior art weed trimmers by increasing cutting performance and preventing flexible materials from wrapping about the cutting elements and shafts.

20 Claims, 6 Drawing Sheets

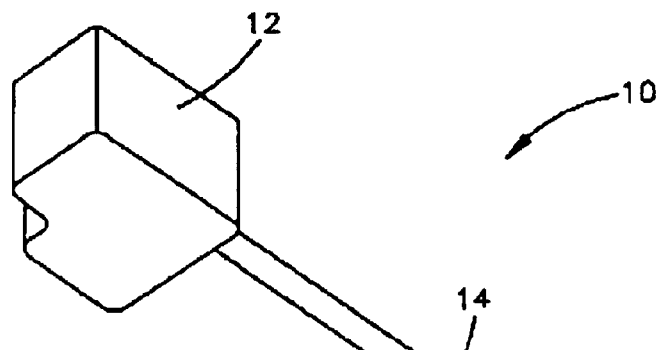
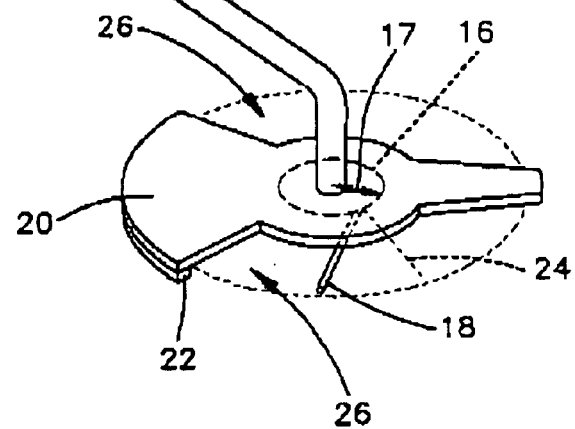
Fig.1
Prior Art
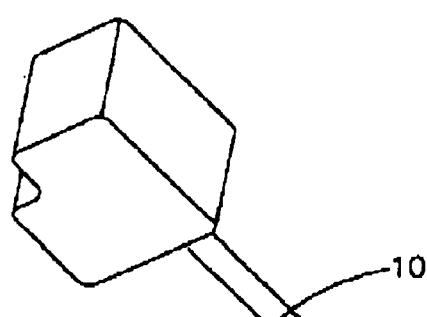
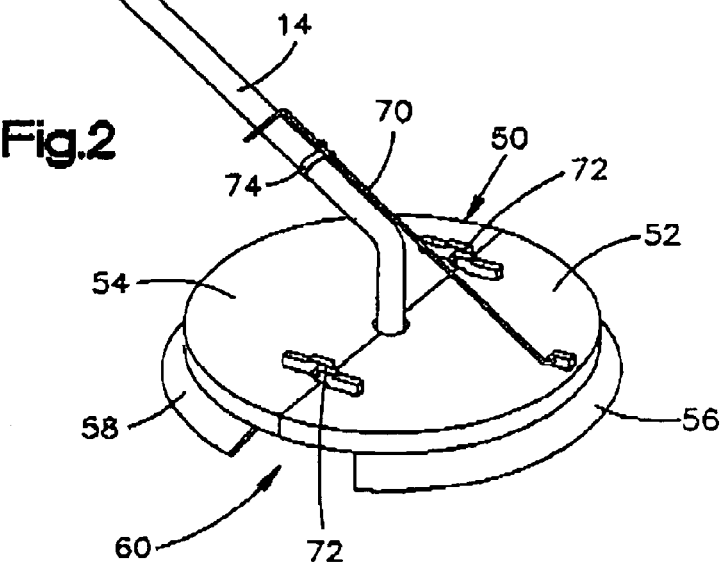
Fig.2

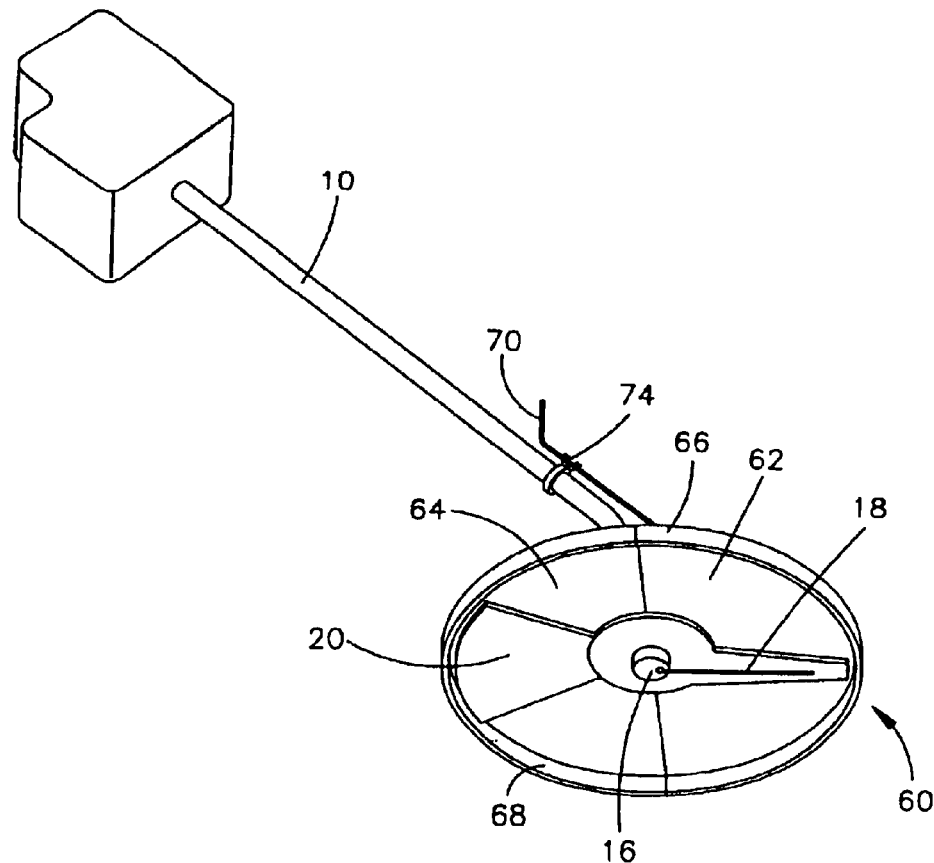
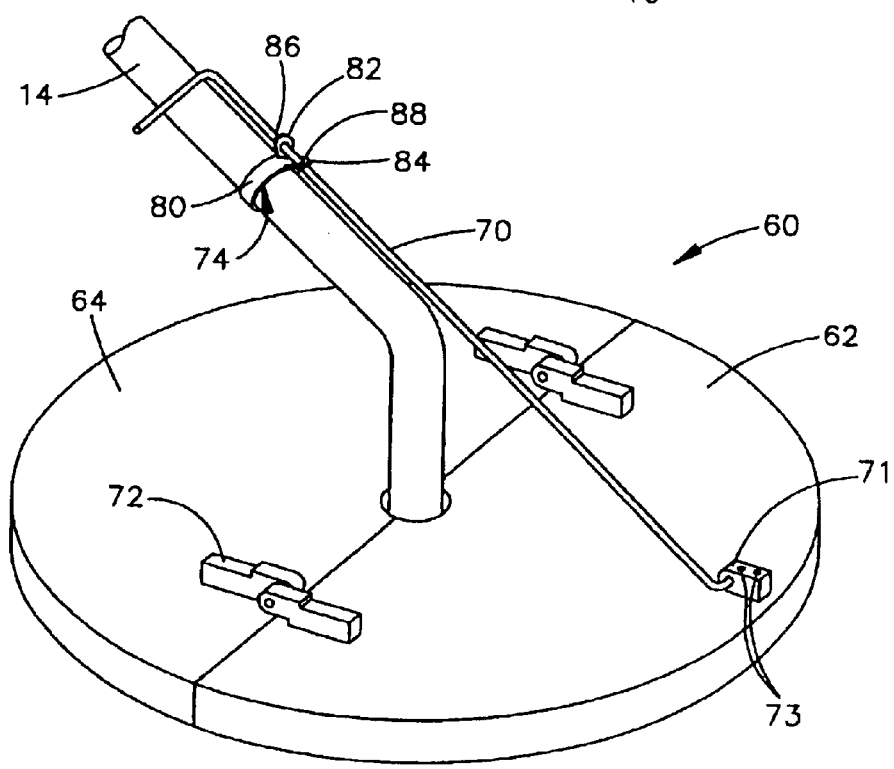

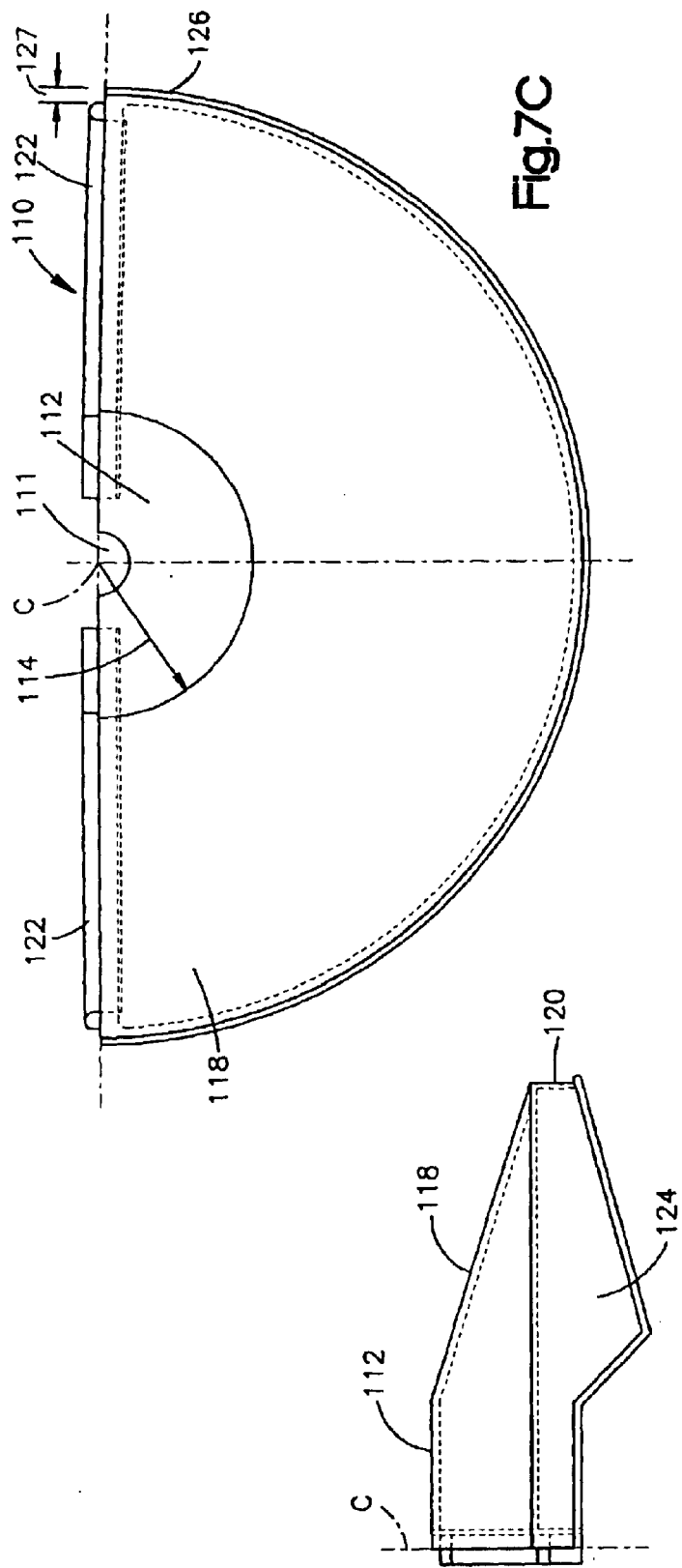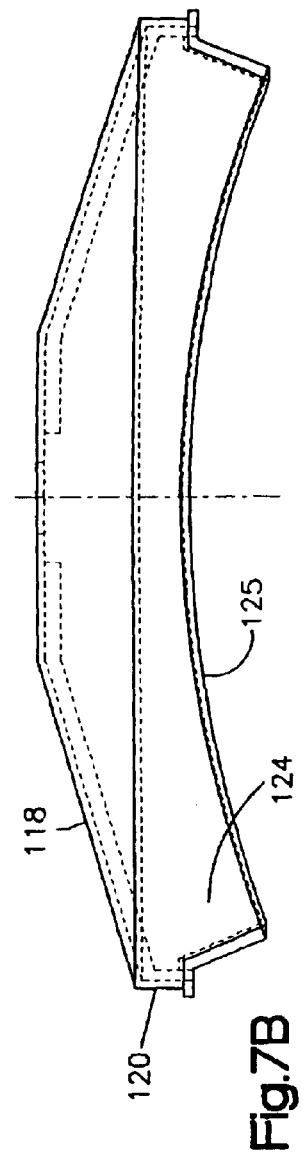

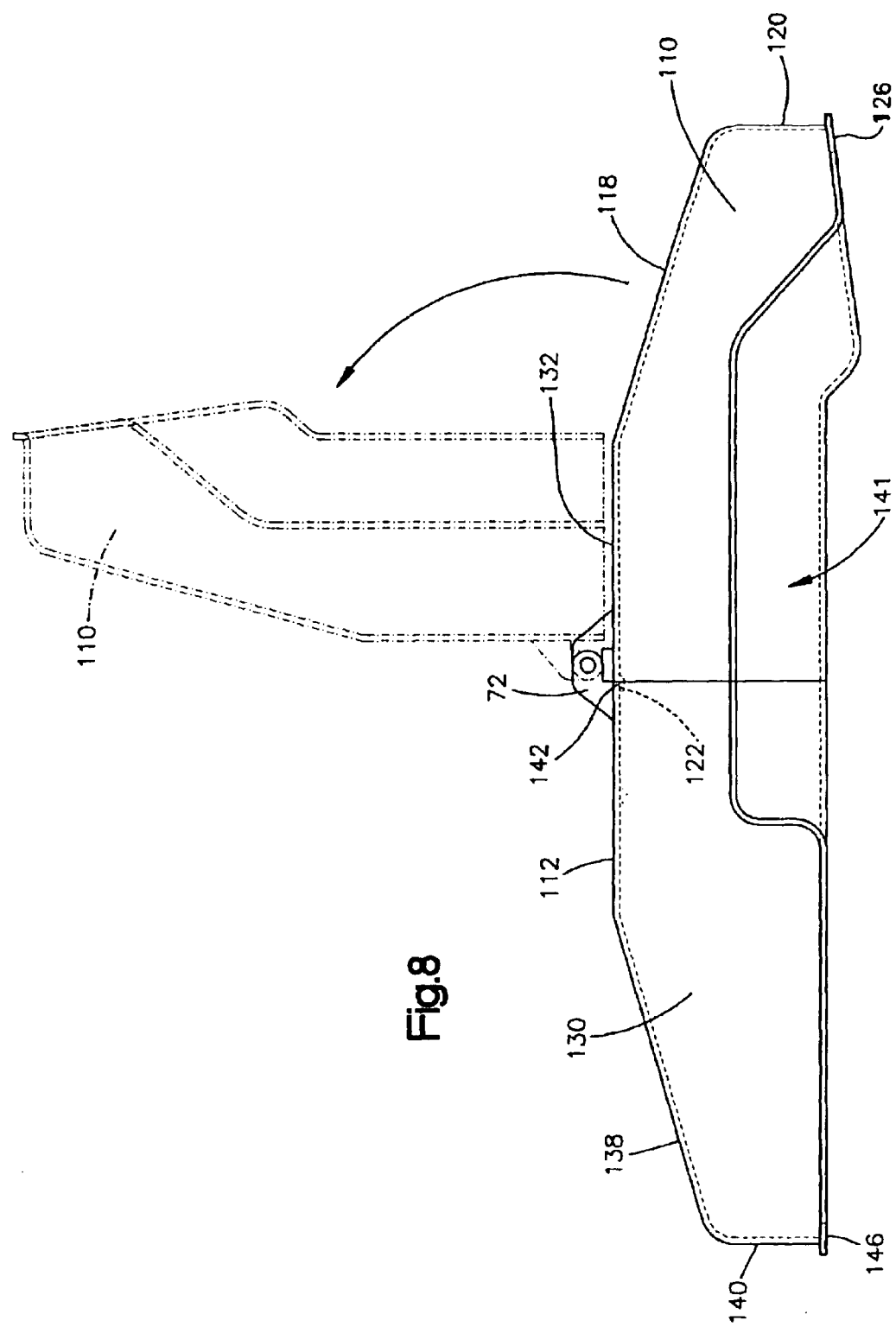

WEED TRIMMER SAFETY GUARD

CROSS REFERENCE TO RELATED APPLICATION

This application claims the benefits of provisional patent application Ser. No. 60/399,595, confirmation number 2681, filed Jul. 30, 2002.

FIELD OF THE INVENTION

The present invention provides a method and apparatus for providing protection and control of debris and projectiles emitted by power tools. More particularly, the present method and apparatus provide an improved protective cover and performance enhancing system for powered lawn care tools, such as powered weed trimmers.

BACKGROUND OF THE INVENTION

Weed trimmers are popular lawn care items in use by both consumers and lawn care professionals. The most popular form of power weed trimmer is the gasoline or electric engine device wherein a motor drives a nylon cord in a rapid rotary fashion. The cord then strikes and cuts down thin stemmed vegetations, most typically grasses and other shrubs and weeds. Weed trimmers are made by many different manufacturers. Typical well-known brands are Weed-Eater®, Black & Decker® and those made by the John Deere Corporation.

Referring now to FIG. 1, a typical prior art weed trimmer 10 is depicted. A gasoline or electrical engine motor assembly 12 is attached by a shaft element 14 to a rotary device 16. The rotary device 16 projects a cutting element 18. Typically, the rotary device 16 is a spool, upon which is wrapped a quantity of nylon or plastic line. A portion of the line extends from the spool to define the cutting element 18. Alternatively, the rotary device 16 may project a plurality of rigid permanent cutting elements (not shown) formed from plastic or metal materials. The motor assembly 12 drives the rotary device 16 via the shaft 14 in a rapid fashion, wherein the rotary device 16 spins at a high revolutions-per-minute (RPM) rate, thereby spinning the cutting element 18 at a higher rate of speed, which cuts through weeds, shrubs, and other thin woody stemmed vegetation, easily cutting them at the base, much like a lawn mower with metallic cutting blades. On top of and enclosing the spinning element 16 and the cutting element 18, is a rear cover element 20. The rear cover element 20 serves two primary functions. Its first function is to protect the user of the weed eater from being struck by the cutting element line 18 or by debris cut by the cutting element 18 and thrown through the force of the cutting action or dispersed. Stones, rocks, stems, cut grass, and other debris would be cast backwards upon a user if not for the rear cover element 20. The rear cover element 20 also has a cutting element 22, which serves to cut the end of the cutting element line 18 and, therefore, assure a uniform cutting radius 24, which defines the area trimmed by the weed trimmer apparatus 10.

However, there are many disadvantages with the prior art weed trimmers described thus far. Since the cover element 20 is designed to cover and protect only the rear of the cutting element 18, the device only prevents debris from being scattered in the rearward direction. It also offers only limited protection against injury from encounters with the cutting element 18 as it is cutting rapidly about the base of the weed trimmer. Anyone who encounters the rotating cutting element from the side or the front of the weed trimmer may be injured by the rapidly moving cutting element 18. Also, debris, sticks, grass, small stones, and anything else that may be struck by the rapidly moving cutting element 18 may be scattered about to the sides and to the front of the prior art weed trimmer 10. This problem is particularly undesirable where one is trimming vegetation by a lake and does not wish to have vegetation and debris cast into the lake, creating an unsightly mess that must be removed at an expense of time and labor.

Furthermore, even though the cover 20 protects from debris being flung rearward during the cutting action of the cutting element 18, debris still becomes compelled rearward towards a user of the weed eater 10 through the open side areas 26. As a result, a user is typically covered with cut grass and all sorts of other debris that strikes the legs and feet of the user utilizing the typical prior art weed trimmer 10.

Typical prior art weed trimmers also have problems cutting tall flexible vegetations, such as tall thick grasses, which tend to wrap around the shaft area immediately above the rotating spool of the cutting element cord and may even stall the weed trimmer. When cutting this type of material, a user must often stop and clean off the shaft and spool area. To avoid this problem, such vegetations can only be cut slowly, by passing the trimmer through small amounts of material in a slow fashion.

What is needed is a way to improve the very popular and typical prior art weed trimmer 10, wherein the trimmer may be adapted to prevent debris from being flung to the front and sides of the weed trimmer. The safety of the weed trimmer should also be improved for those using the device, and for bystanders to the front and side of the device, while the cutting element is being used to strike vegetation or other small and cuttable elements. The ability of the prior art trimmer to efficiently cut tall flexible vegetation should also be improved.

SUMMARY OF THE INVENTION

The present invention provides for an article and method for an improved cutting element cover apparatus that protects both the user of a weed trimmer, and those standing nearby the user of a weed trimmer, from projectiles and debris being distributed to the front and sides or portions of the sides of the weed trimmer while the weed trimmer is being used. A preferred embodiment of the weed trimmer comprises a domed guard structure that encompasses the effective cutting range of a prior art weed trimmer. Alternative embodiments may comprise elements that protect only portions of front, side and rear cutting areas. Embodiments of the invention also allow a user to lift up a cover element to allow close work among obstructions. Embodiments of the present invention also improve the performance of prior art weed trimmers by increasing cutting performance and preventing flexible materials from wrapping about the cutting elements and shafts.

BRIEF DESCRIPTION OF THE DRAWINGS

FIG. 1 is a perspective illustration of a prior art weed trimmer and rear guard.

FIG. 2 is a perspective illustration of an application of one embodiment of the present invention.

FIG. 3 is a perspective illustration of an application of another embodiment of the present invention.

FIG. 4 is a perspective illustration of an application of another embodiment of the present invention.

FIGS. 7A, 7B and 7C are a series of side, top and front plan views of part of the embodiment of the invention of FIG. 6.

FIG. 8 is a side view of the embodiment of the invention of FIG. 6.

DESCRIPTION OF PREFERRED EMBODIMENTS OF THE INVENTION

Figure 5:
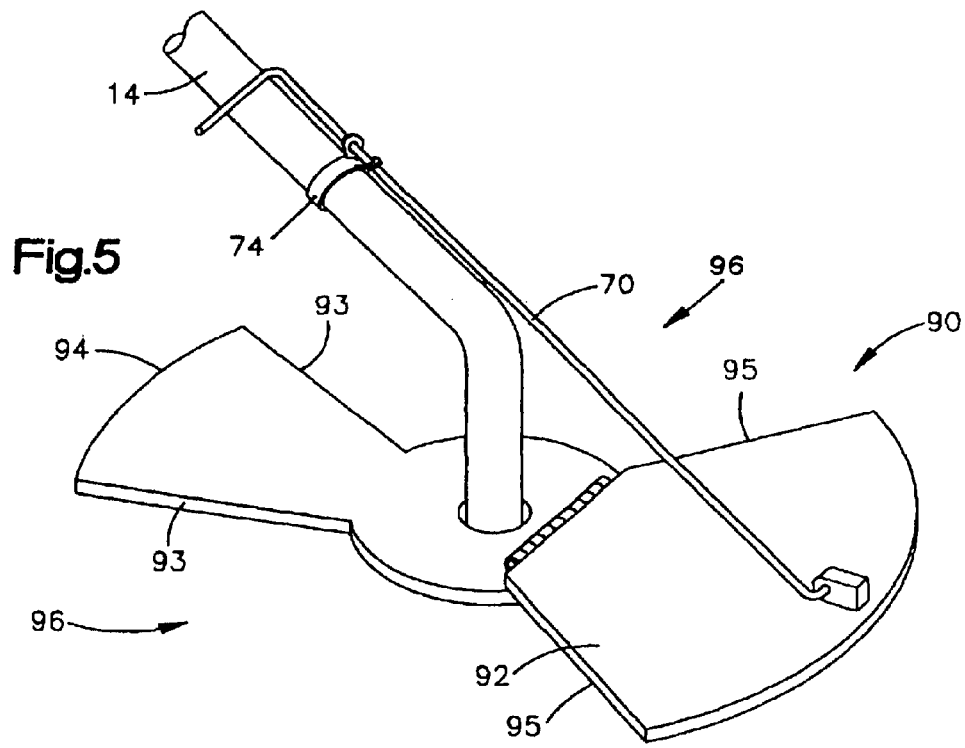
FIG. 5 is a perspective illustration of an application of another embodiment of the present invention.

Referring now to FIG. 2, one embodiment of the present invention is illustrated. A circular adjustable covering assembly 50 is shown attached to the prior art weed trimmer 10 of FIG. 1. The assembly, according to the present invention, consists of a front semicircular element 52 and a rear semicircular element 54, both attached about the shaft 14 above the typical prior art weed trimmer guard 20. Although, in the present embodiment, the embodiment 50 is attached directly on top of a pre-existing rear facing guard 20, it should be readily understood that the present invention may be utilized in place of the typical prior art rear guard element 20.

The semicircular front and rear cover elements 52 and 54 each have a partially semicircular flange element 56 and 58 associated with it, respectively. These flange elements 56 and 58 help to compel weeds, vegetation, tall grasses, and other elements desired to be cut by the weed trimmer 10 cutting element 18 (not shown) toward the cutting element 18. In this way, the present invention assists the prior art weed trimmer 10 in compelling vegetation towards the cutting element 18.

FIG. 2 also illustrates a gap 60 between the front flange element 56 and the rear flange element 58. Although not a requirement of the present invention, such a gap element 60 may be desired by the user of the present invention in order to help expel cut material and thereby improve the efficiency of a weed trimmer 10 utilizing the present invention. The gap 60 may also increase cutting efficiency by reducing the amount of horizontal vegetation deflection when the weed trimmer 10 is swept sideways to encounter the vegetation. Vegetation passing through the gap 60 will be deflected downward less by the higher cover elements 52 and 54 than by the lower flange elements 56 and 58. Various embodiments of the invention, both as disclosed herein and as possibly practiced under the teachings of the present invention, will have different gap dimensions and sizes and may, in fact, have no gap elements.

FIG. 3 is a bottom view of a prior art trimmer incorporating another embodiment 60 of the present invention wherein front cover element 62 and rear cover element 64 have continuous flange elements 66 and 68 that travel the entire circumference of each of the semicircular elements 62 and 64, and thereby flange elements 66 and 68 form a continuous circular flange element as shown in FIG. 3.

It is preferred that a front cover element according to the present invention can be raised and lowered into different positions for weed trimming operations. This can be accomplished by connecting a front cover element to the rear cover element, or to the weed trimmer itself, by a hinge means, and by providing a raising and lowering means connected to the front cover element. One example of a raising and lowering means is a flexible chain (not show) or cable (not shown) attached to the front cover element. A hook (not shown) or clamp means (not shown) may be attached to the weed trimmer shaft above the front cover element, in order to engage the cable or chain. A user may raise the front cover element by the cable or chain into a desired position, and then secure the cover in place by engaging the chain or cable with the hook or clamp. Practicing such a raising and lowering means will be readily apparent to one skilled in the art.

Referring again to FIG. 2, another raising and lowering means is provided. A rod element 70 is shown attached to the front guard element 52. Hinge elements 72 also are shown connecting the front element 52 and rear cover element 54. The binge elements 72 are preferably spring-loaded hinge elements, wherein the front cover 52 is compelled by the spring element 72 into a downward and horizontal alignment with flip rear cover 54. The rod 70 is used to raise and lower the front cover element 52. The rod 70 is held in a desired position by a locking means 74 attached to the shaft 14 of the prior art weed trimmer 10. By using the locking means 74, the shaft 70 can be fixed into any desired position, thus allowing the front cover element 52 to be positioned into a fixed relationship with respect to the rear cover 54 in any one of a number of positions. FIG. 2 shows the front cover 52 aligned substantially parallel with the rear cover 54, thus forming a circular composite structure when the front cover 52 is in a "down" position. Or the front cover 52 can be raised up and stopped into a fixed position from the previous horizontal position wherein the front cover 52 is brought upward toward the shaft 14, thereby allowing the weed trimmer cutting element to cut matter close to vertical obstructions, such an trees or walls.

FIG. 4 is a more detailed view of the rod 70, locking element 74, and spring hinge element 72 as incorporated in the embodiment 60 shown in FIG. 3. The locking mechanism 74 is a tensioned metal butterfly spring device. The rod 70 is disposed between an upper finger projection 82 and a lower finger projection 84 through apertures 86 and 88, respectively. A base element 80 of the locking means 74 is clamped about the prior art weed trimmer shaft 14. By squeezing the upper butterfly element 82 and the lower butterfly element 84 toward each other, tension is released from the spring-like action of the elements 82 and 84, which would otherwise attempt to spread apart from each other and exert pressure on the rod element 70 through their interface with their respective apertures 86 and 88 with the rod element 70. By removing this tension, by squeezing 82 towards 84, the rod 70 can be easily slid upward or downward through the apertures 86 and 88 until the front cover 62 is compelled to a desired position. Once the front cover 62 is aligned in a desired position, a user releases the butterfly elements 82 and 84 and, through the resilient spring tension, they are compelled away from each other and exert locking pressures upon the rod 70, as is well known in the mechanical arts. It is preferred, as explained earlier, that the hinge elements 72 have internal springs. In this way, the front cover 62 will be compelled downward without any effort by a user while adjusting the position of the front element 62 with the rod 70. This enables the front element 62 to have a "default" position of down and fully aligned with the rear element 64. Thus, the preferred and safest position for utilizing the present invention 60 is enabled by the spring action of the spring hinge elements 72.

Rod 70 is connected to the front guard element 62 by means of a flange 71, which may be typically screwed into the front guard element 62 by screws 73.

The guard elements 62 and 64 and 52 and 54 are preferably made from a rigid plastic material. Plastics provide a variety of possible lightweight, rigid, resilient and flexible material structures which are ideally suited for absorbing the projectiles and abuse typical in weed trimming operations. Plastic materials are also typically lightweight, thereby enabling the present invention to be easily utilized on a prior art weed trimmer 10 without unreasonably increasing the weight of the resultant assembly. Although the embodiment described thus far utilizes a plastic material, other materials may be suitable depending on a desired application, such as metal or rubber types of compounds. Stated another way, the embodiments described thus far utilize rigid and resilient plastic materials. However, other materials may be suitable, and those skilled in the art may readily select other materials for use with the present invention.

Referring now to FIG. 5, another embodiment of the present invention 90 is depicted. Here, a front element 92 and a rear clement 94 are attached to a prior art weed trimmer shaft 14. In contrast to the embodiment of the invention depicted in FIG. 4, the invention embodiment 90 shown in FIG. 5 has two triangular shaped front and rear elements 92 and 94. Between the outer edge 93 of the rear element 94 and the outer edge 95 of the front element 92, a large aperture 96 is formed on both sides of the weed trimmer assembly. The gap 96 may be desired by a user who wishes some of the materials being mulched by the cutting element 18 to be expelled to the sides of the weed trimmer assembly. It may also be preferable to have a visual gap 96 so that a user of a conventional weed trimmer 10 can see the results of the trimming action by the cutting element 18 as he progresses through his cutting applications.

Referring again to FIG. 4, the front cover element 62 and rear cover element 64 may be essentially identical in size and shape and, therefore, may be manufactured from the same die. Stated another way, the front cover element 62 may be manufactured to be adapted to be used as the rear cover element 64, and visa versa. This allows for efficiencies in manufacturing and part stocking requirements, significantly lowering the cost of practicing the invention. Moreover, only one cover element 62 or 64 need be installed as either a front or rear cover where only a semi-circular cutting element coverage is desired, again reducing cost for the purchaser. This is also possible for the embodiment of the invention 90 depicted in FIG. 5, wherein the front element 92 and rear cover element 94 may be adapted to be interchanged.

Figure 6:
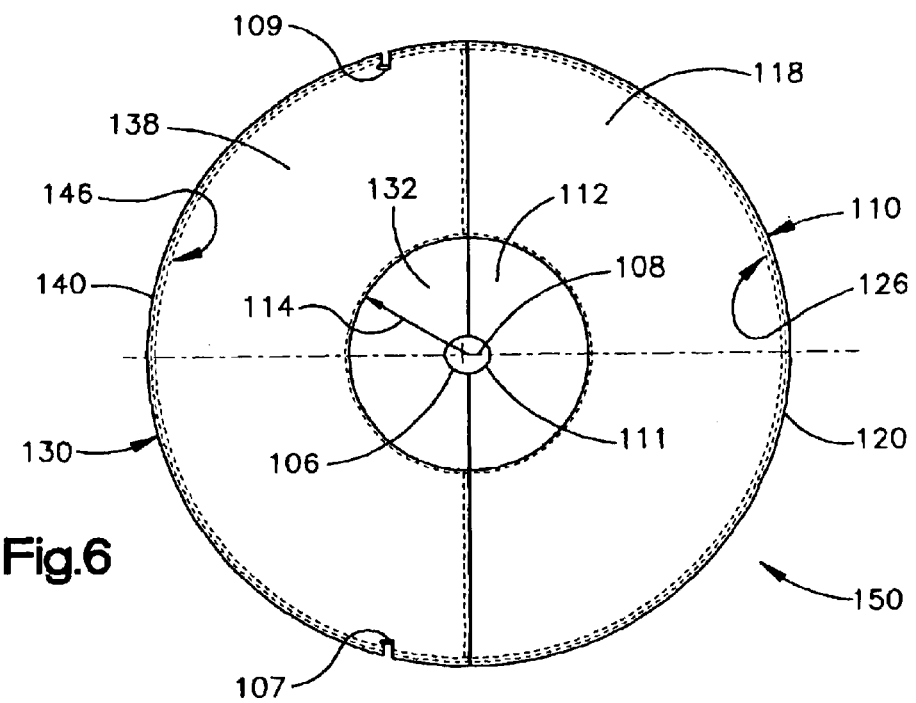
FIG. 6 is a top plan view of another embodiment of the present invention.

FIG. 6 depicts a top plan view of another embodiment of the present invention, a composite closed dome structure 150 comprising a front cover 110 and back cover 130. At the center of the composite dome structure 150 is an oval aperture 108. The generally oval aperture 108 defined about a central axis C is configured for reception of a conventional prior art weed trimmer shaft 14 and formed by a semi-circular aperture 111 in the front cover 110 and a semi-oval aperture 106 in the back cover 130. A line cutter element 107 is attached at the periphery of the rear cover 130 for cutting the weed trimmer cutting element 18 at the end and thereby assuring a uniform radius for the reach of the cutting element 18. Line cutter 107 is preferably configured to trim a cutting element 18 rotating in a clockwise direction. In some embodiments of the invention, an additional line cutter 109 is provided to trim a cutting element 18 rotating in a counterclockwise direction. Alternatively, line cutter 107 may be a two-sided blade configured to trim the cutting element 18 as it rotates in both clockwise and counterclockwise directions. FIG. 7 provides additional views of the front cover 110, and FIG. 8 is a side view of the composite dome structure 150.

Front cover element 110 and back cover element 130 preferably each also have planar semi-circular regions 112 and 132 defined about the apertures 111 and 106, respectively. It is intended that, when the front cover 110 is in a "down" position, the planar semi-circular regions 112 and 132 are aligned parallel with and above the prior art weed trimmer cutting element spool 16 once attached to the shaft 14. It is also preferred that the radius 114 of the semi-circular regions 112 and 132 is common and substantially corresponding to the radius 17 defined by the spinning rotary device 16. However, it is to be understood that other embodiments of the present invention may not have planar semi-circular regions, or that other regions of different shapes and alignments with respect to the rotary device 16 may be formed by front and rear cover elements, both larger and smaller than a rotary device 16.

Radiating out from the regions 112 and 132 are conical sidewalls 118 and 138, respectively. Each conical sidewall 118 and 138 terminates at a cylindrical edge sidewall 120 and 140, respectively. The front cover 110 has flanges 122 for receiving the inner edge 142 of the back cover 130. With the front cover 110 and back cover 130 attached to a weed trimmer 10, and with the front cover 110 in the "down" and aligned position as shown in FIG. 8, the flanges 122 and edge 142 form a substantially sealed interface between the front 110 and rear 130 cover, thereby forming the "dome" structure 150 shown.

Further projecting downward from the front cover cylindrical edge sidewall 120 is an arched projection 124. By providing an arch structure, the bottom edge 125 of the arch 124 may be rested on a flat surface, such as a sidewalk, while the weed trimmer rotary device 16 is held at an angle to the surface. At the bottom of the front cover sidewall 120 and arched projection 124 is a common lip 126 projecting inward. Similarly, at the bottom of the rear cover edge sidewall 140 is a lip 146 projecting inward. In one embodiment of the invention, the lips 126 and 146 each have an inward projection dimension 127 of about 0.25 inches; however, other dimensions are possible, and this dimension is given for exemplary purposes only and is in no way meant to limit the dimension 127.

When attached to a prior art weed trimmer, the dome 150 alignment of the present invention keeps debris and projectiles from being scattered forward and to the side when trimming vegetation. What is new and unexpected is that the dome structure 150 also improves the performance of the weed trimmer 10. It has been found that tall flexible vegetation, such as tall thick grass, does not readily wrap around the rotary device 16 or shaft 14 when trimming. Due to the interaction of the cutting element 18 and the dome structure 150, a prior art weed trimmer now can trim such tall and flexible material rapidly and without requiring frequent stops to clean off entangled materials from the weed trimmer assembly.

Tall vegetation may be cut by bringing the weed trimmer and dome 150 laterally against the vegetation, through a side-to-side or front-to-back motion, or combination thereof, as is typical and well known with regular prior-art weed trimmers. With a lateral motion, the arched projection 124 provides improved access to the cutting element 18 by tall vegetations by decreasing the amount of lateral vegetation deflection at the tops of the arch 124. It has also been found that bringing the dome 150 downward along a vertical direction upon tall vegetation increases cutting efficiency, since the vegetation is not deflected laterally by a sideways motion before it is cut. The dome structure 150 directs the vegetation into the cutting element 18, while the dome 150 is lowered upon the vegetation, through the cooperative efforts of the semi-circular regions 112 and 132, conical sidewalls 118 and 138, cylindrical edge sidewalls 120 and 140, arched projection 124, and lips 126 and 146. It also believed that these elements in cooperative relationship with the rotating cutting element 18 create beneficial air currents that help direct vegetation upwards into the cutting element 18. These currents allow the weed trimmer 10 with dome 150 to "mulch" cut material by drawing it back up into the cutting element 18 after it has been cut. Experimentation has shown that trimming times can be cut in half for difficult to cut materials when compared to a typical prior art trimmer 10 without the present invention. It is also believed that downward wind pressures immediately below the inner surfaces of the semi-circular regions 112 and 132 and conical sidewalls 118 and 138 prevent material from rising up and wrapping about the rotary device 16 and shaft 14, thus clearing entangling material from the shaft 14. Furthermore, it is also believed that the downward wind pressures prevent nylon cord cutting elements 18 from rising upward while rotating at high velocities, thereby keeping the cord 18 in a horizontal planar alignment while it is rotating and cutting vegetation.

Another benefit of the present invention is that the useful life of the cutting element 18 is extended. The dome structure 150 is found to significantly increase the life of nylon string cutting elements 18. This is due to its propensity to prevent vegetation wrapping about the cutting element 18, rotary device 16 and shaft 14. It also prevents lateral contact with hard obstructions, wherein the dome structure 150 acts as a "shield" between the cutting element 18 and lateral hard obstructions.

Experimentation has shown that the dome 150 reduces grasses and debris scattered forward into a lake by as much as 90%, while also greatly reducing the amount of grass and debris deposited on a user's clothing, as compared with prior art weed trimmers with only small rear cover guards 20.

A gap region 141 is also formed between the sidewalls 140 and 120 and conical sidewalls 118 and 138, providing advantages similar to those discussed above in the discussion of gap 60 of an alternative embodiment of the invention.

Figure 9:
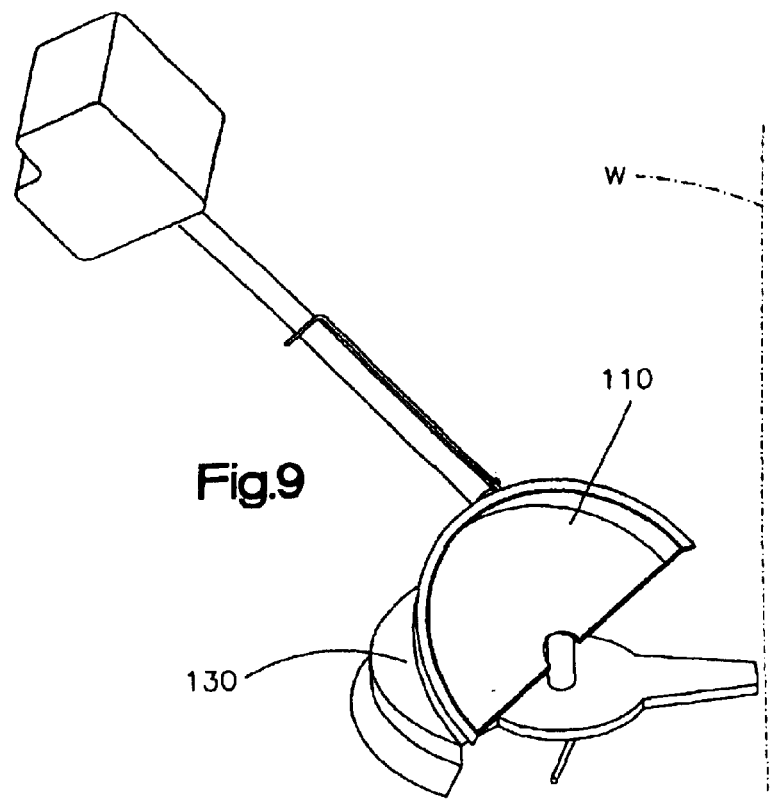
FIG. 9 is another perspective illustration of the embodiment of the invention of FIG. 6.

As shown by the phantom figure in FIG. 8, and by the view of FIG. 9, the front cover 110 may be rotated about hinges 72 and positioned in a raised "up" position. In the "up" position, the present invention allows weed trimming operations close to obstructions, such as a vertical wall W. An important feature of the present invention is that when a front cover element is adjusted into an "up" position, the front cover element still provides full protection for a weed trimmer operator from the rearward projection of debris by the cutting element.

Figure 10:
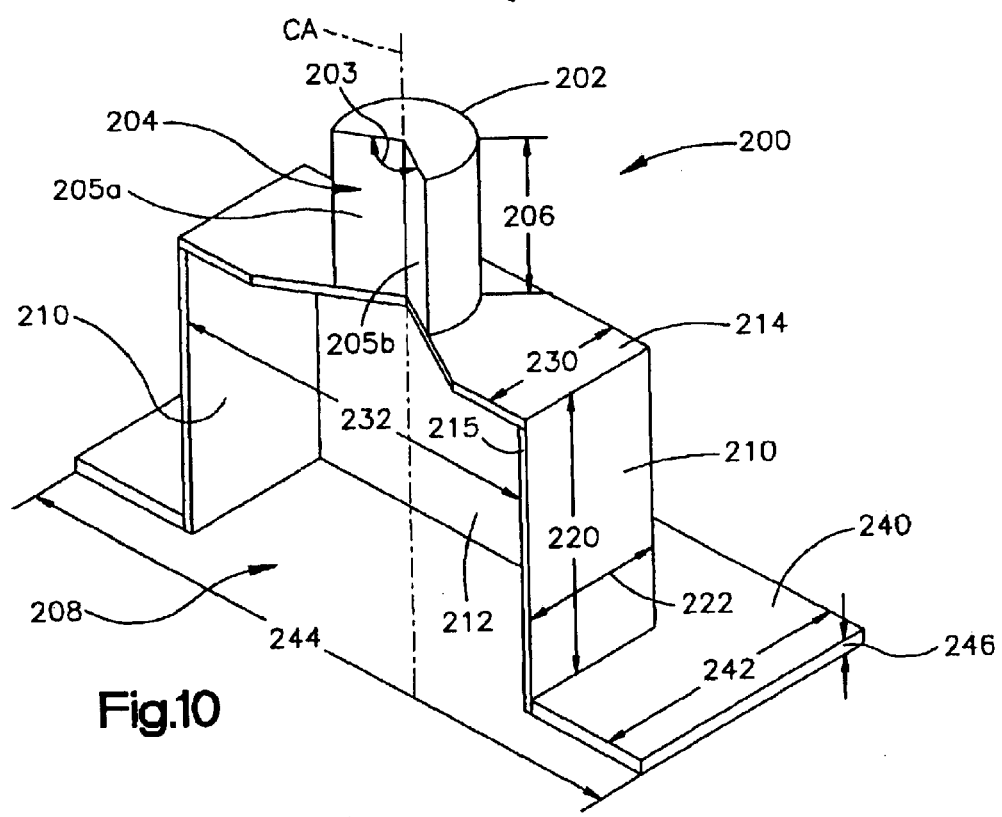
FIG. 10 is a perspective illustration of a bracket mounting structure according to the present invention.

FIG. 10 illustrates a bracket structure 200 according to the present invention, preferably fabricated from plastic materials. The bracket is preferably used to attach a front cover 110, 92, 62 or 52 to a trimmer shaft. A top cylindrical element 202 is defined about a central axis CA for attachment to a trimmer shaft 14 (not shown) within a wedge-shaped aperture 204, wherein the central axis CA is aligned to the engaged portion of the shaft 14. The attaching means (not shown) is typically a clamping means, such as an adjustable stainless steel band clamp, as is well known in the mechanical arts. The cylindrical element 202 has a height 206 and an angle 203 between wedge walls 205a and 205b. It is preferred that the height 206 and angle 203 are selected to accommodate both straight and curved weed trimmer shafts of various outside diameter dimensions. In one embodiment, height 206 is about 1.125 inches and angle 203 is about 120 degrees.

A clearance box area 208 is defined by two side walls 210, front wall 212 and top wall 214. The clearance box 208 is intended to allow the device to fit about the top of the shaft 14 and rotary device 16 without engaging them. In one embodiment, the side walls 210 have a height dimension 220 of about 2.25 inches and a width dimension 222 of about 1 and ⅛ inches; the top wall 214 has a width dimension 230 of about 3 and 1/16 inches and a length dimension 232 of about 3 and 1/16 inches; and the front wall 212 has height dimension 220 and width dimension 232. The walls 210, 212 and 214 all have a thickness 215 of about ⅛ inch.

At the bottom of the clearance area 208 is a mounting plate 240 for attachment to a front cover element according to the present invention. In the embodiment shown, the plate 240 is a planar rectangle with a width 242 of about 2 inches, a length 244 of about 5 inches and a thickness 246 of about 0.25 inches.

While preferred embodiments of the invention have been described herein, variations in the design may be made, and such variations may be apparent to those skilled in the art of making tools, as well as to those skilled in other arts. The materials identified above are by no means the only materials suitable for the manufacture of the tool, and substitute materials will be readily apparent to one skilled in the art. The scope of the invention, therefore, is only to be limited by the following claims.

What is claimed is:

1. A weed trimmer cover assembly for attachment to a weed trimmer, comprising:
    a front cover defining a front horizontal cover region disposed above a weed trimmer cutting element and covering a forward area of a horizontal circular cutting zone defined by a rotational cutting path of the cutting element,
    a front vertical flange projecting downward from the front horizontal cover region and generally along a radius corresponding to and larger than a radius defined by the cutting zone; and
    a cover attachment means attached to the front cover and connecting the front cover to the weed trimmer, the cover attachment means further comprising a hinge wherein the front cover can be pivoted about the hinge and thereby raised upward along a range of positions from completely lowered downward to completely raised upward;
    wherein the front horizontal cover region and the front vertical flange are configured to deflect debris being projected by the cutting element, thereby preventing projected debris from being distributed forward or upward and rearward relative to the weed trimmer.

2. The weed trimmer cover assembly of claim 1, wherein the cover attachment means further comprises a positional fixing linkage connected to the front cover, wherein the front cover can be pivoted about the hinge and thereby raised upward into a fixed position with the positional fixing linkage, the fixed position located along the range of positions from completely lowered downward to completely raised upward.

3. The weed trimmer cover assembly of claim 1, wherein the front horizontal cover region and the front vertical flange further prevent projected debris from being distributed to at least one of a leftward direction and a rightward direction relative to the weed trimmer.

4. The weed trimmer cover assembly of claim 3, further comprising:
- a rear cover defining a rear horizontal cover region disposed above the weed trimmer cutting element and covering a rearward area of the horizontal circular cutting zone;
- a rear vertical flange projecting downward from the rear horizontal cover region and along a radius corresponding to and larger than a radius defined by the cutting zone;
- the cover attachment means further attached to the rear cover and connecting the rear cover to the weed trimmer; and
- wherein the rear horizontal cover region and the rear vertical flange deflect debris being projected by the cutting element, thereby preventing the projected debris from being distributed rearward relative to the weed trimmer.

5. The weed trimmer cover assembly of claim 4, wherein the front horizontal cover region is semicircular with a half-circle outer edge and a linear inner edge, the front vertical flange projecting downward from the outer edge;
- the rear horizontal cover region is semicircular with a half-circle outer edge and a linear inner edge, the rear vertical flange projecting downward from the outer edge;
- the front cover inner edge and the rear cover inner edge aligned together, the front horizontal cover region, the front vertical flange, the rear horizontal cover region and the rear vertical flange configured to thereby define a composite dome structure.

6. The weed trimmer cover assembly of claim 5, wherein the front flange further has an arch-shaped bottom edge, wherein the horizontal circular cutting zone defined by a rotational cutting path of the cutting element may be positioned at an acute angle to a horizontal planar work surface and the arch-shaped bottom edge may rest upon the horizontal planar work surface.

7. The weed trimmer cover assembly of claim 5, wherein the front flange and the rear flange each further have a bottom edge, and the front flange bottom edge and the rear flange bottom edge each further define a lip projecting inward.

8. The weed trimmer cover assembly of claim 4, further comprising:
- a first cutting line trimmer that projects downward from at least one of the front and rear covers, the first line trimmer configured to trim a cutting element line rotating clockwise; and
- a second cutting line trimmer that projects downward from at least one of the front end rear covers, the second line trimmer configured to trim a cutting element line rotating counterclockwise.

9. The weed trimmer cover assembly of claim 4, wherein the front cover and rear cover both comprise resilient thermoplastic materials.

10. The weed trimmer cover assembly of claim 1, wherein the cover attachment means further comprises first and second linear weed trimmer shaft engaging edges, the first and second linear weed trimmer shaft engaging edges defining a shaft engagement angle therebetween of about 120 degrees.

11. A method for deflecting debris being distributed from a weed trimmer, comprising the following steps:
- providing a weed trimmer cover attachment means on a weed trimmer, the cover attachment means further comprising a hinge;
- attaching a front cover to the hinge wherein the front cover can be pivoted about the hinge and thereby raised upward along a range of positions from completely lowered downward to completely raised upward;
- providing a front horizontal cover region projecting from the front cover and disposed above a weed trimmer cutting element and covering a forward area of a horizontal circular cutting zone defined by a rotational cutting path of the cutting element;
- providing a front vertical flange projecting downward from the front horizontal cover region and generally along a radius corresponding to and larger than a radius defined by the cutting zone; and
- the front horizontal cover region and the front vertical flange deflecting debris being projected by the cutting element, thereby preventing projected debris from being distributed forward or upward and rearward relative to the weed trimmer.

12. The method of claim 11, further comprising the following steps:
- the cover attachment means further providing a positional fixing linkage connected to the front cover;
- the front cover pivoted about the hinge and thereby raised upward into a fixed position with the positional fixing linkage, the fixed position located along the range of positions from completely lowered downward to completely raised upward.

13. The method of claim 12, further comprising the step of the front horizontal cover region and the front vertical flange deflecting projected debris and thereby preventing debris from being distributed to at least one of a leftward direction and a rightward direction relative to the weed trimmer.

14. The method of claim 13, further comprising the steps of:
- attaching a rear cover to the attachment means;
- the rear cover defining a rear horizontal cover region disposed above the weed trimmer cutting element and covering a rearward area of the horizontal circular cutting zone;
- projecting a rear vertical flange downward from the rear horizontal cover region and along a radius corresponding to and larger than a radius defined by the cutting zone; and
- the rear horizontal cover region and the rear vertical flange deflecting debris projected by the cutting element, thereby preventing the projected debris from being distributed rearward relative to the weed trimmer.

15. The method of claim 14, further comprising the following steps:
- projecting a first cutting line trimmer downward from at least one of the front and the rear covers, the first line trimmer configured to trim a cutting element line rotating clockwise; and
- projecting a second cutting line trimmer downward from at least one of the front and the rear covers, the second line trimmer configured to trim a cutting element line rotating counterclockwise.

16. The method of claim 14, wherein the front horizontal cover region is semicircular with a half-circle outer edge and a linear inner edge, the front vertical flange projecting downward from the outer edge;
- the rear horizontal cover region is semicircular with a half-circle outer edge and a linear inner edge, the rear vertical flange projecting downward from the outer edge;

further comprising the step of aligning the front cover inner edge and the rear cover inner edge together, the front horizontal cover region, the front vertical flange, the rear horizontal cover region and the rear vertical flange thereby defining a composite dome structure.

17. The method of claim 16, further comprising the step of the front flange defining an arch-shaped bottom edge, wherein the horizontal circular cutting zone defined by a rotational cutting path of the cutting element may be positioned at an acute angle to a horizontal planar work surface and the arch-shaped bottom edge may rest upon the horizontal planar work surface.

18. The method of claim 16, wherein the front flange and the rear flange each further have a bottom edge, and the front flange bottom edge and the rear flange bottom edge each further define a lip projecting inward.

19. The method of claim 16, further comprising the steps of rotating the weed trimmer cutting element;

the weed trimmer cutting element generating cooperative air currents with the composite dome structure;

the cooperative air currents urging debris away from the cutting element.

20. The method of claim 19, further comprising the step of the cooperative air currents deflecting long vegetation from wrapping around the weed trimmer about the rotating cutting element.

* * * * *